(12) United States Patent
Degbotse et al.

(10) Patent No.: US 8,452,637 B2
(45) Date of Patent: May 28, 2013

(54) SYSTEMS AND METHODS OF ADJUSTING THE ORDER OF PRODUCT MANUFACTURING AND RESCHEDULING RELEASE DATES

(75) Inventors: Alfred T. Degbotse, Colchester, VT (US); Robert J. Milne, Jericho, VT (US); Stuart H. Smith, Austin, TX (US); Jacqueline N. Ward, South Hero, VT (US)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 12/796,716

(22) Filed: Jun. 9, 2010

(65) Prior Publication Data

US 2011/0307087 A1    Dec. 15, 2011

(51) Int. Cl.
*G09F 17/00* (2006.01)
(52) U.S. Cl.
USPC ........................................................ 705/7.29
(58) Field of Classification Search
USPC ........................................................ 705/7.29
See application file for complete search history.

(56) References Cited

U.S. PATENT DOCUMENTS

| | | | |
|---|---|---|---|
| 5,155,679 A | 10/1992 | Jain et al. | |
| 6,356,797 B1 | 3/2002 | Hsieh et al. | |
| 6,484,370 B2 | 11/2002 | Kanie et al. | |
| 6,701,201 B2 | 3/2004 | Hedge et al. | |
| 7,209,887 B2 | 4/2007 | Yen et al. | |
| 7,286,889 B1 | 10/2007 | Orzell et al. | |
| 7,515,983 B2 | 4/2009 | Orzell et al. | |
| 2005/0171625 A1* | 8/2005 | Denton et al. | ........... 700/102 |
| 2005/0177465 A1 | 8/2005 | Orzell et al. | |
| 2008/0111176 A1 | 5/2008 | Barrows et al. | |
| 2009/0108320 A1 | 4/2009 | Barrows et al. | |

* cited by examiner

*Primary Examiner* — Thomas Dixon
(74) *Attorney, Agent, or Firm* — Gibb & Riley, LLC

(57) ABSTRACT

Techniques are presented for rescheduling manufacturing releases. A plurality of release information elements are identified based on a first run of a first advanced planning system. The release information elements comprise dates of planned manufacturing release and quantity. The plurality of release information elements are sorted based on associated demand-likelihood factors and a plurality of sorting criteria. Swapping candidates are selected and swaps are performed based on the demand-likelihood factors and at least one swapping constraint. The plurality of release information elements are then fixed and output as results. A second run of an advanced planning system is optionally performed before output and may include stability features.

17 Claims, 11 Drawing Sheets

SYSTEMS AND METHODS OF ADJUSTING THE ORDER OF PRODUCT MANUFACTURING AND RESCHEDULING RELEASE DATES

BACKGROUND

The present invention relates to scheduling, and more specifically to rescheduling manufacturing releases. Advanced Planning Systems (APS) are often used in planning production starts, interplant shipments, customer shipments, and substitutions. These APS systems often use Linear Programming (LP) techniques to allocate limited capacity and material resources efficiently given a prioritized statement of demand.

When there is not enough capacity in later time periods to support demand just-in-time, a conventional APS will attempt to build some product early in order to satisfy the demand on time. A problem exists in that conventional APS may build the wrong product early. That is, the product built early may be that used in satisfying demands which have a relatively high probability of perishing at a later time. However, it would be preferable if the product built early is used to satisfy demand which has a high probability of being consumed. For example, if product X is being released into the manufacturing line to satisfy a forecasted demand and product Y is being released to satisfy a firm customer order, then it would be better to build product Y early rather than product X since product Y is for a firm customer order while product X is merely associated with forecast demand. Conventional APS systems do not ensure the right product is built early.

SUMMARY

The systems and methods according to this invention provide for rescheduling manufacturing releases. In a first embodiment, a plurality of release information elements are identified based on a first run of a first advanced planning system. The release information elements comprise dates of planned manufacturing release and quantity. The plurality of release information elements are sorted based on associated demand-likelihood factors and a plurality of sorting criteria. Swapping candidates are selected and swaps are performed based on the demand-likelihood factors and at least one swapping constraint. The plurality of release information elements are then fixed and output as results. A second run of an advanced planning system is optionally performed before output and may include stability features.

In a second embodiment, the advanced planning system is based on linear programming and/or a heuristic method.

In a third embodiment, the plurality of release information elements are associated with demands traced through a bills of materials supply chain to underlying assets.

In a fourth embodiment, a weighted average is used when an underlying asset supports multiple demands.

In a fifth embodiment, the underlying assets are split when non-lotsized underlying assets support multiple demand likelihood factors non-concurrently.

In a sixth embodiment, the swapping comprises identifying swap candidates from bottom bills of materials which do not support daily-going-rates. The earliness of candidate releases are determined and the releases are sorted based on earliest releases, least demand likelihood factors and largest number of days early. A next swapping candidate is assigned and a later swapping candidate associated with a higher value of said demand-likelihood factor is found that satisfies the swapping criteria. The next swapping candidate and the later swapping candidate are then swapped.

In a seventh embodiment, determining if said swap of said next swapping candidate and said later swapping candidate is partial, continue finding later swapping candidates associated with a higher value of said demand likelihood factor that satisfies said swapping criteria for the balance remaining after the partial swap.

In an eighth embodiment, the swapping comprises steps that find the capacity consumption rates of each candidate manufacturing release. The candidate manufacturing release is then set equal to the next candidate manufacturing release in the sorted list of release information elements. The best candidate is identified for swapping with the candidate manufacturing release based on the selection of a swap candidate which supports the highest demand-likelihood-factor of the candidates meeting the criteria that as a tie breaker, allow the candidate manufacturing release to be delayed as long as possible. Then as a secondary tie-breaker, allow as large a quantity of the candidate manufacturing release to be delayed as possible and which meets all of the following criteria: has a higher demand-likelihood-factor than the candidate manufacturing release; has a planned manufacturing release date which is later than the candidate manufacturing release; has a planned manufacturing release date which is no earlier than the latest date that the candidate manufacturing release may be released without delaying its consumption from inventory; consumes capacity such that if said swap candidate is swapped with the candidate manufacturing release that each will have capacity available in the respective swapped time periods to support their release at that time; will not cause a failure to satisfy any minimum-starts constraints if the candidate manufacturing release and said swap candidate are swapped. The release date of said swap candidate and the candidate manufacturing release are then swapped, for as large a quantity of the candidate manufacturing release as possible.

A ninth embodiment discloses an apparatus for rescheduling manufacturing releases comprising a memory for storing the output of advanced planning systems and a processor. The processor identifies a plurality of release information elements from a first run of a first advanced planning system stored in the memory. The release information elements comprise dates of planned manufacturing release and quantity. The processor sorts the plurality of release information elements based on associated demand-likelihood factors and a plurality of sorting criteria. The plurality of release information elements are swapped based on said demand-likelihood factors and at least one swapping constraint. The plurality of release information elements are then fixed and an output circuit which is connected to the processor and the memory outputs the fixed plurality of release information elements as results.

DETAILED DESCRIPTION

Figure 1:
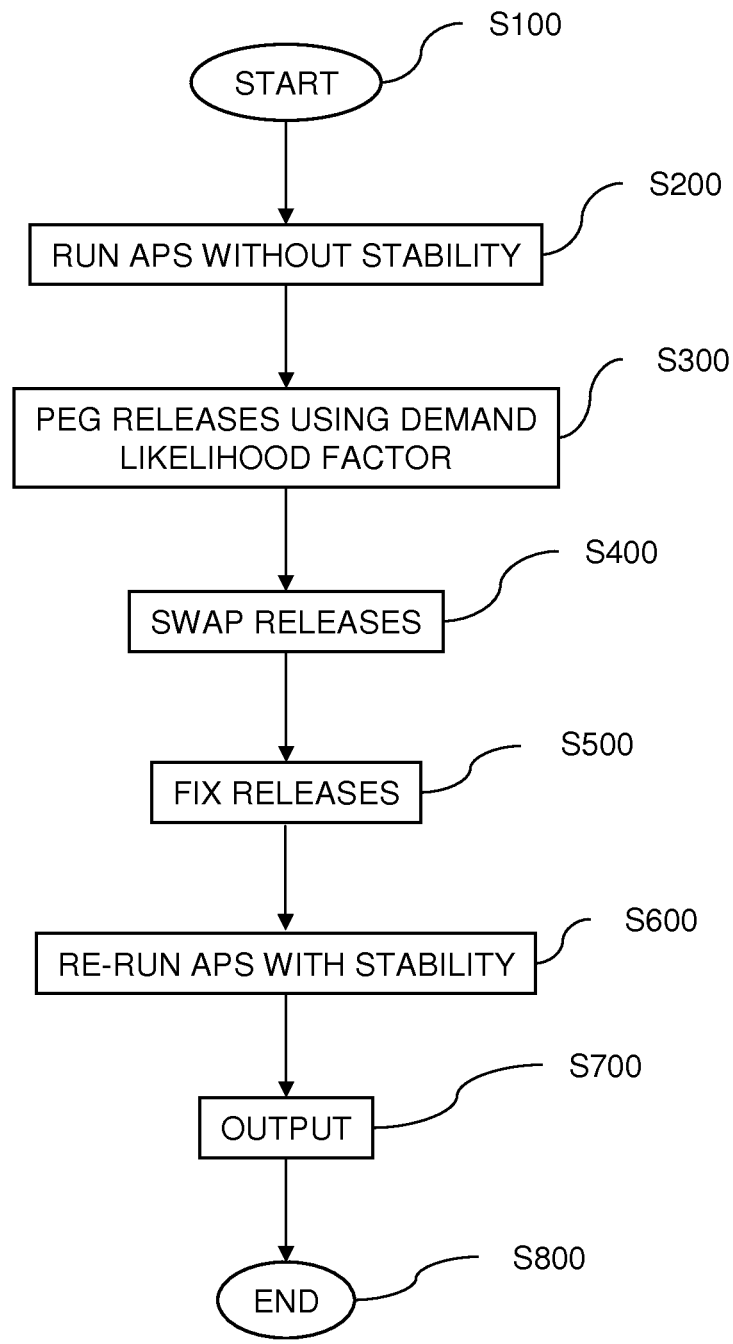
FIG. 1 shows an overview of an exemplary method of rescheduling manufacturing releases according to this invention.

When an early build occurs, due to limited capacity in later time periods, the wrong product is often built early. That is, where the wrong product is the product for which the demand is more likely to disappear by the time the product would normally be released than other products that could be produced. The problem is then how to encourage an APS to build the right product early. The systems and methods according to this invention provide a series of post-processing steps which occur after an initial production plan has been created using a conventional APS. In one exemplary embodiment according to this invention, a linear program is used as the APS. However, it will be apparent that the systems and methods according to his invention are applicable to heuristic APS engines as well.

As a result of releasing the right product early, it is more likely to build product which will be needed because their demands will be less likely to disappear by the time the production has been completed. For example, suppose that products X and Y each have their latest demands due on 30 June and with lead times would each be released in January. Due to capacity shortages in the first quarter, either product X or Y needs to be released in the present month (say October). Conventional APS systems would release either product X or Y early and arbitrarily so long as both will be delivered to the customer(s) on time. For example, a conventional APS may determine that product X will be released early. However, the demand for product X may be much more likely than the demand for product Y to disappear or perish by January. If the demand for product X does disappear and the demand for product Y does not disappear, a conventional APS produces needless inventory if product X is produced early. This wastes capacity. In contrast, the systems and methods according to this invention will produce product Y which will be needed and which is therefore a prudent usage of capacity.

A linear program (LP) is composed of an objective function that defines a measure of the quality of a given solution, and a set of linear constraints. A production planning linear program (an APS), such as that described in U.S. Pat. No. 5,971,585, will determine production planning decisions including: manufacturing releases, material substitutions, and shipments planned to customers, between manufacturing and distribution locations, and from vendor suppliers. The types of equations used in production planning models are well know to those practiced in the art and include: (1) Material Balance Constraints, which ensure conservation of material flow through the network of stocking points comprising the supply chain; (2) Capacity Constraints, which ensure that the capacity available for manufacturing activities is not exceeded; (3) Backorder Conservation Constraints, which balance the quantity of a given part backordered in a given planning period with the quantity backordered in the previous planning period and the net of new demand and new shipments; and (4) Sourcing Constraints, which define target ranges (minimum and maximum) of shipments that should be made from a particular manufacturing or vendor location in the supply chain.

A conventional LP formulation is provided below in the form familiar to those practiced in the art; i.e., definition of subscripts, definition of objective function coefficients, definition of constants, definition of decision variables, LP formulation or equations.

Definition of Subscripts j—time period m—material (part number)

a—plant location within the enterprise n—material being substituted z—group (which represents a family or collection of part numbers)

e—process (a method of purchasing or manufacturing a material at a plant)

v—receiving plant location k—demand center (i.e., customer location) (Note: the set of customer locations is mutually exclusive from the set of plant locations)

q—demand class which indicates relative priority w—resource capacity which could be a machine, labor hour, or other constraint u—represents a consumer location which refers to an internal plant, external demand center, or to a generic indicator meaning any plant/or demand center Definition of Objective Function Coefficients $PRC_{jmae}$—cost of releasing one piece of part m during period j at plant a using process e $SUBC_{jmna}$—substitution cost per piece of part number n which is being substituted by part number m during period j at plant a $TC_{jmav}$—transportation cost per piece of part number m leaving plant a during period j which are destined for plant v $INVC_{jma}$—inventory cost of holding one piece of part number m at the end of period j at a particular plant a $DMAXC_{jzau}$—cost per piece of exceeding the maximum amount of shipments of group z parts from plant a to consuming location(s) u during period j $DMINC_{jzau}$—cost per piece of falling short of the minimum amount of shipments specified for group z parts from plant a to consuming location(s) u during period j $BOC_{jmkq}$—backorder cost of one piece of part m at the end of period j for class q demand at customer location k Definition of Constants $DEMAND_{jmkq}$—demand requested during time period j for part number m at customer location k for demand class q $RECEIPT_{jma}$—quantity of projected wip and purchase order receipts for part number m expected to be received at plant a during time period j $CAPACITY_{jaw}$—Capacity of resource w available at plant a during period j to support production starts $CAPREQ_{jmaew}$—Capacity of resource w required for part number m at plant a for process e during period j $QTYPER_{jmaen}$—quantity of component m needed per part number n during period j at plant a using process e $YIELD_{jmae}$—output of part number m per piece released or started at plant a during time period j using process e $SUBQTY_{jmna}$—quantity of part number m required to substitute for one piece of part number n at plant a during time period j $MAXPCT_{jzau}$—maximum percentage of total shipments of group z (collection of parts) leaving supplier a during period j to support consumption at consuming location(s) u MINPCT$_{jzau}$ minimum percentage of total shipments of group z (collection of parts) leaving supplier a during period j to support consumption at consuming location(s) u CT$_{jmae}$—Cycle time. The number of periods between the release and completion of part m jobs for releases made using process e at plant a during time period j TT$_{mav}$—transport time for part number m from plant a to plant v Definition of LP Decision Variables I$_{jma}$—Inventory at the end of period j for part number m at a particular plant a P$_{jmae}$—Production starts of part m during period j at plant a using process e L$_{jmna}$—Quantity of part number n which is being substituted by part number m during period j at plant a T$_{jmav}$—Internal shipments of part number m leaving plant a during period j which are destined for plant v F$_{jmakq}$—Shipments of part number m leaving plant a during period j and satisfying class q demand at external customer k B$_{jmkq}$—Back orders of part m at the end of period j for class q demand at customer location k H$_{jzu}$—Total shipments of group z (z is a "collection" of parts) leaving suppliers during period j to support consumption at consuming location(s) u S$_{jzau}$—Amount by which total shipments of parts in z from plant a to consuming location(s) u during period j exceeds the maximum amount specified as desired in the sourcing rules G$_{jzau}$—Amount by which total shipments of group z parts from plant a to consuming location(s) u during period j falls short of the minimum amount specified as desired in the sourcing rules LP Equations or Formulation The following minimizes the objective function subject to the constraints shown below.

Objective Function:

Minimize:

$$\sum_j \sum_m \sum_a \sum_e PRC_{jmae} P_{jmae} +$$

$$\sum_j \sum_m \sum_n \sum_a SUBC_{jmna} L_{jmna} \sum_j \sum_m \sum_a \sum_v TC_{jmav} T_{jmav} +$$

$$\sum_j \sum_m \sum_a INVC_{jma} I_{jma} + \sum_j \sum_z \sum_a \sum_u DMAXC_{jzau} S_{jzau} +$$

$$\sum_j \sum_z \sum_a \sum_u DMINC_{jzau} G_{jzau} + \sum_j \sum_m \sum_k \sum_q BOC_{jmkq} B_{jmkq}$$

Subject to:

Sourcing Constraints:

$$H_{jzu} = \sum_{\substack{m \\ \varepsilon z}} \sum_a \left( T_{jmau} + \sum_q F_{jmauq} \right)$$

$$\sum_{\substack{m \\ \varepsilon z}} \left( T_{jmau} + \sum_q F_{jmauq} \right) - S_{jzau} \leq MAXPCT_{jzau} H_{jzu}$$

-continued $$\sum_{\substack{m \\ \varepsilon z}} \left( T_{jmau} + \sum_q F_{jmauq} \right) + G_{jzau} \geq MINPCT_{jzau} H_{jzu}$$

Capacity Constraints:

$$\sum_m \sum_e CAPREQ_{jmaew} P_{jmae} \leq CAPACITY_{jaw}$$

Backorder Constraints:

$$B_{jmkq} = B_{(j-1)mkq} + DEMAND_{jmkq} - \sum_a F_{jmakq}$$

Material Balance Constraints:

$$I_{jma} = I_{(j-1)ma} + RECIEPT_{jma} + \sum_{\substack{x \leq t \\ x+CT_{xmae}=j}} \sum_e YIELD_{xmae} * P_{xmae} +$$

$$\sum_n L_{jmna} + \sum_{\substack{x \leq t \\ x+TT_{mav}=j}} \sum_v T_{xmva} - \sum_n SUBQTY_{jmna} * L_{jmna} -$$

$$\sum_v T_{jmav} - \sum_k \sum_q F_{jmakq} - \sum_{\substack{nst \cdot m \\ is\,a\,component \\ of\ n}} \sum_e QTYPER_{jmaen} P_{jnae}$$

Non-Negativity Constraints:

all X$_{i,j\ldots}$ $\geq 0$, where X is a generic decision variable and i, j etc. represent generic subscripts FIG. 1 shows an overview of an exemplary method of rescheduling manufacturing releases according to this invention. The process begins at step S100 and immediately continues to step S200 where an APS is run. The advanced planning system is preferably run without enabling stability options. Once the APS has been run in S200 without stability, control continues to step S300.

In step S300, the releases are pegged using a demand likelihood factor rather than the demand class priorities used in conventional APS. In one exemplary embodiment, the demand likelihood factor is the probability the demand will exist at the time the planned start supporting it would be released into the manufacturing line in the absence of capacity constraints. In an alternative embodiment, the demand likelihood factor may indicate the probability the demand will exist at the time the planned start supporting it would be released into the manufacturing line in the absence of capacity constraints. For example, a demand having a demand likelihood factor of say 8 would have a greater probability of existing later than a demand having a demand likelihood factor of 3. In such an alternative embodiment, the demand likelihood factor may indicate a rank order preference rather than an absolute statement of probability.

Once the releases are pegged using the demand likelihood factors, control continues to step S400.

The releases are swapped in step S400. However, the process only considers as candidates, part numbers that are at the bottom of the bills of materials supply chain and includes parts which have no components. Releases that support daily-going-rates are excluded from consideration.

In step S500, the manufacturing release start variables are fixed to previously determined values for all part numbers at the bottom of the bills of material. However, still other exemplary embodiments according to this invention fix production start variables only for those parts which were later modified. Those skilled in the art will recognize that the fixing of production start variables needs to be done explicitly if a linear program is used as the APS in the re-run. However, if a heuristic method is used as the APS in the re-run, then those skilled in the art will understand that the fixing of production start variables may be done implicitly by simply leaving them untouched during the subsequent calculations. An upper bound is then placed on backorder variables to their values as initially determined. Control then continues to step S600 where the APS is re-run. The stability options may be optionally enabled during this run. After the APS has been re-run, control continues to step S700. The revised manufacturing release and shipment plan output by the APS is displayed or output. Control continues to step S800 and the process ends.

Figure 2:
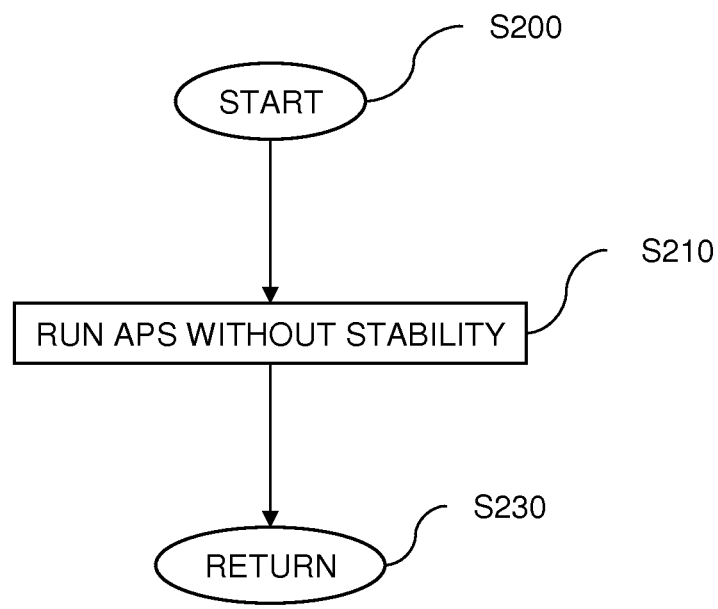
FIG. 2 shows an expanded flowchart of an exemplary initial APS run according to this invention.

FIG. 2 shows an expanded flowchart of an exemplary initial APS run according to this invention. In this exemplary embodiment, the initial APS is run without any stability enhancing features.

This step may be simply the execution of an APS. However, in some contexts, users may place parts into a "stability file" so that inventory penalties, heuristics or other stability enhancing features lead to production starts occurring only when there is a "clear runway" of available capacity enabling just-in-time processing. For example, in the conventional APS linear programming formulation described above, parts in the stability file would have their inventory penalty in the objective function ($INVC_{jma}$) set to a higher than normal value thus encouraging those parts to be consumed soon after their completion so as to avoid the higher inventory penalty. In one embodiment according to this invention, the stability function is turned off during this first run of the APS since the intention is not to ensure a "clear runway" but rather to ensure that released parts will be processed through subsequent operations as quickly as possible without adversely impacting customer service. After the APS has been run without stability, control continues to step S230. The process then returns and immediately continues to step S300 of FIG. 1.

Figure 3:
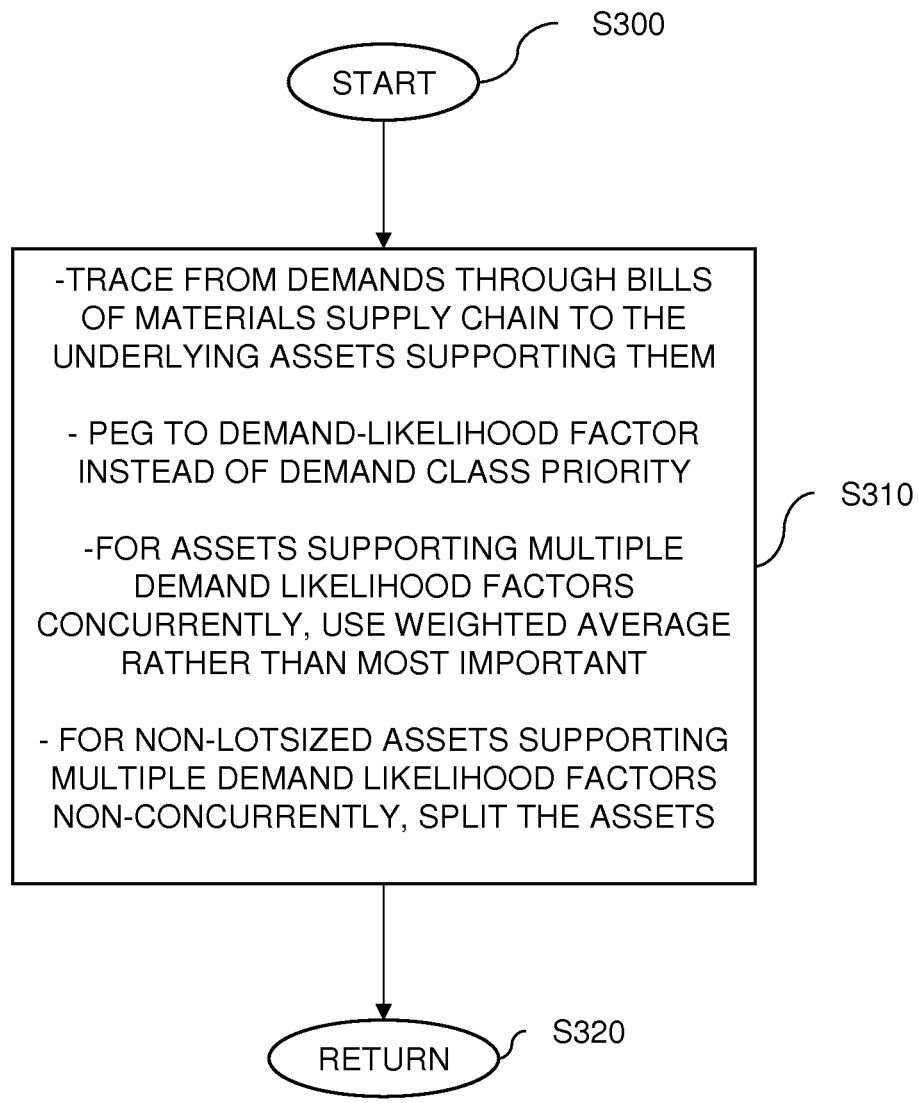
FIG. 3 shows an expanded flowchart of an exemplary pegging of manufacturing releases to the demand they represent according to this invention.

FIG. 3 shows an expanded flowchart of an exemplary pegging of manufacturing releases to the demand-likelihood factors they represent according to this invention. The process begins at step S300 and continues immediately to step S310.

In step S310, the demands are traced through the bills of materials supply chain to the underlying assets; pegging is performed based on the actual demand-likelihood factor; and a weighted average is used for assets supporting multiple demand factors non-concurrently. Various exemplary embodiments according to this invention extend conventional supply-pegging techniques discussed in co-assigned U.S. Pat. Nos. 6,701,201 and 7,606,743, each incorporated herein by reference in their entirety. In particular, exemplary embodiments according to this invention extend conventional supply peg to "supply peg" the end-item demand attributes to the underlying manufacturing releases supporting them. In particular, whereas these conventional techniques peg demand class priority, for various exemplary embodiments according to the present invention, a demand-likelihood-factor is used to accomplish the pegging.

Conventional APS describes how the demand is pegged to the releases. However, the pegging logic of the present invention is different in several aspects. For example, instead of pegging demand class priority through the supply chain, a factor indicating the likelihood of the demand still existing later in time is passed through the supply chain. In one exemplary embodiment according to this invention, the demand-likelihood-factor is the probability that the demand will exist at the time it would be released into the manufacturing line in the absence of capacity constraints. However, it will be apparent that ordinal numbers or other sortable elements or other indicators capable of expressing a rank ordering preference may also be used in the practice of this invention.

The higher values of the demand-likelihood-factor indicate a greater probability of the demand surviving. However, it will be understood that if the user prefers to use lower values of demand-likelihood-factors to indicate higher probability of demand surviving, then a below sorting step needs to change slightly from ascending sequence of demand-likelihood-factors to descending sequence. For example, in various other exemplary embodiments according to this invention, demand-class-priority is used as a crude replacement for demand-likelihood-factor in which case a sorting step below would be in descending rather than ascending sequence.

If it is determined that the assets support multiple demand likelihood factors concurrently, a weighted average is used rather than using the most important. Thus, in the case of a supply asset supporting multiple demands (due to binning for instance), conventional APS pegs the supply to the demand class priority of the most important demand. In contrast, the systems and methods according to this invention will peg the supply to a weighted average of the demand-likelihood-factors of the respective demands being simultaneously supplied with the weights determined by the respective quantities of the demands supplied. For example, demand of twice the average quantity would have twice the average weight.

Assets are split for non-lotsized assets supporting multiple demand likelihood factors non-concurrently. For example, when a single non-lotsized manufacturing release is pegged to multiple non-concurrent (i.e. non-binning) demand-likelihood-factors, one exemplary embodiment according to this invention will split the release into distinct releases where each has its own demand-likelihood-factor. Splitting is not necessarily done in the conventional systems.

Control continues to step S320 and then continues immediately to step S400 in FIG. 1.

Figure 4:
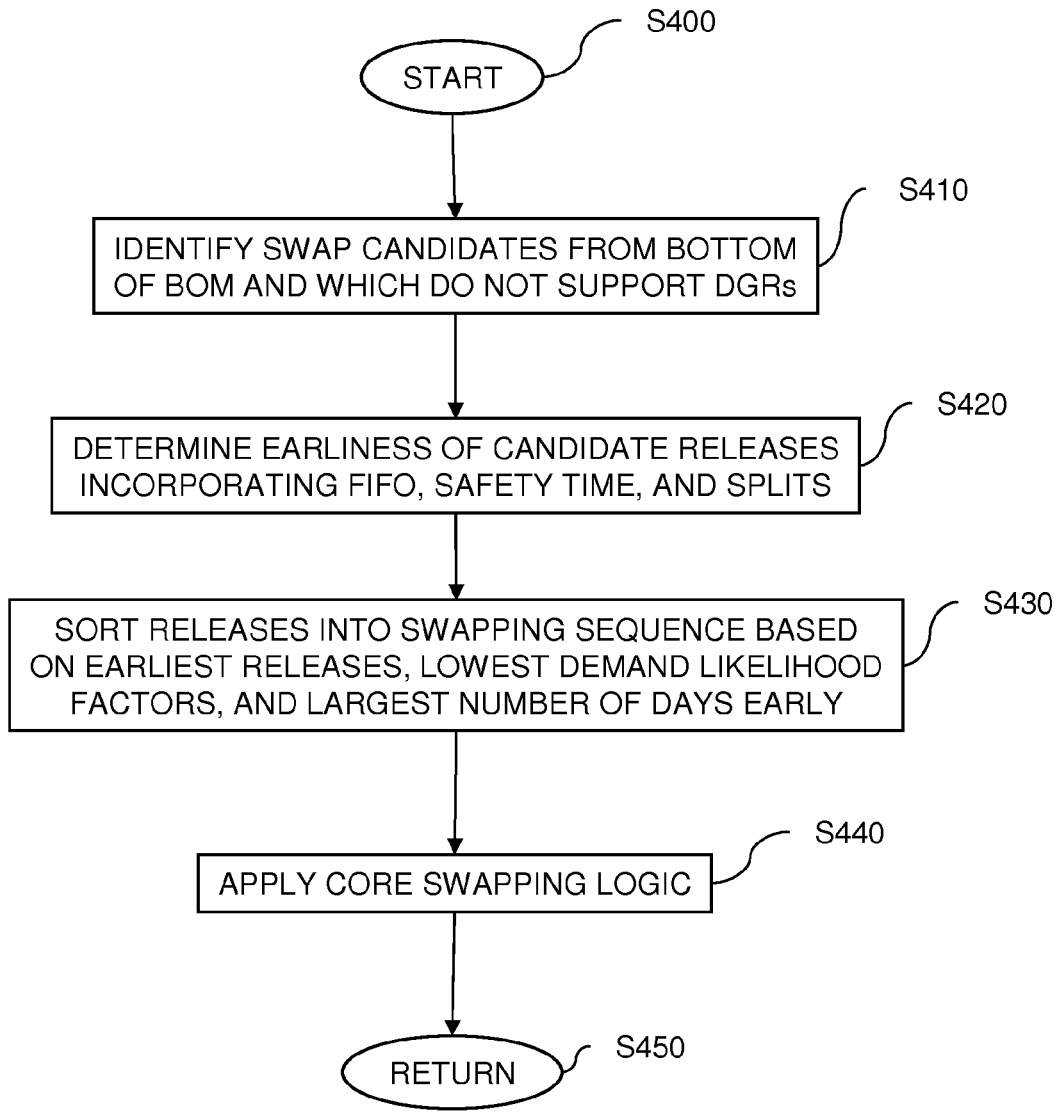
FIG. 4 shows an expanded flowchart of exemplary release swapping according to this invention.

FIG. 4 shows an expanded flowchart of release swapping. The process begins at step S400 and immediately continues to step S410. The initial set of manufacturing releases or planned starts are calculated during the initial APS run in step S200 of FIG. 1. These releases are pegged to the corresponding demand-likelihood-factors they support as described in Step S300 of FIG. 1.

In step S410, only releases which are for part numbers at the bottom of the bills of materials supply chain are considered as candidates for swapping. These are parts which have no components in their bill of materials.

Only those releases which are not supporting daily-going-rates are considered as candidates. Daily-going rates are an inventory that must be on hand at any one point in time, e.g. shippable inventory, and is often (but not necessarily) expressed in terms of pieces per day. Daily-going rates are further discussed in US. Patent Application Publication No. US20080033586A1, herein incorporated by reference in its entirety. Once the swap candidates are determined, control continues to step S420.

In step S420, the earliness of the candidate releases are determined. Thus, in one exemplary embodiment, for each part/plant in the candidate list, all of its assets are found. That is any record which adds to the part/plant's inventory (e.g. on-hand inventory, purchase order receipts, projected WIP, substitutions of other parts for this one, planned purchase receipts, planned internal shipments to be received, planned manufacturing releases). All the issues or any record associated with the consumption of inventory of the part/plant (e.g. internal and external shipments, dependent demands, substitutions of this part at the plant) are found.

The safety time or inventory policy is then subtracted from the issue date. The safety time or inventory policy is a specified number of nonnegative days to protect against uncertainty in delivery times.

Assuming a FIFO consumption of assets (i.e. the assets which arrive earliest into inventory are the first assets to be consumed; when assets have a same in-stock-date, first consume on hand inventory, then planned receipts (from planned WIP completions and planned purchase order receipts), then substitutions, then internal shipments, then vendor shipments, and finally manufacturing releases): match up or net the assets against the safety time offset issues and in so doing, determine how early the candidate manufacturing releases arrive at inventory before being consumed by the offset issues. That is, determine how many days each asset is expected to sit in inventory given the FIFO assumption and not counting the safety time the assets are desired to be in inventory as a protection against uncertainty.

For example, if safety time is 2 days and manufacturing releases of 10, 10, and 10 pieces (100% yield) arriving to stock on April 1, 6, and 11 are the only assets and are consumed by issues of 10, 10, and 10 pieces on April 6, 12, and 22, then the manufacturing releases would be 3, 4, and 9 days early respectively. Thus, applying the 2 day safety time to the April 6 issue date results in an April 4 offset date which is three days later than the April 1 asset availability date indicating that the first asset is three days early.

When a manufacturing release supports consumption of different issues, split it so that each manufacturing release supports consumption of only a single issue. This splitting is only done if the manufacturing release is not subject to binning or lotsizing rules. If binning or lotsizing rules prohibit the splitting of an asset, then an asset supporting multiple issues is matched to the earliest of those issues. After the earliness of candidate releases has been determined, control continues to step S430.

In step S430, the candidate manufacturing releases are then sorted into the desired swapping sequence. In this case, releases sorted into "early in the list" indicates releases that are candidates to "try to delay first".

An exemplary sorting sequence comprises: 1) sort primarily by earliest release dates first; 2) sort secondarily by demand-likelihood-factor (in ascending sequence: manufacturing releases supporting the least firm—least likely—demands are first in the list); 3) sort tertiarily by the number of days early (in descending sequence: so that those of a same release date and demand likelihood which are built ahead by the greatest magnitude are processed first). After sorting, control continues to step S440 where the core swapping logic is applied. Control then continues to step S450, returns and immediately continues to step S500 of FIG. 1.

Figure 5:
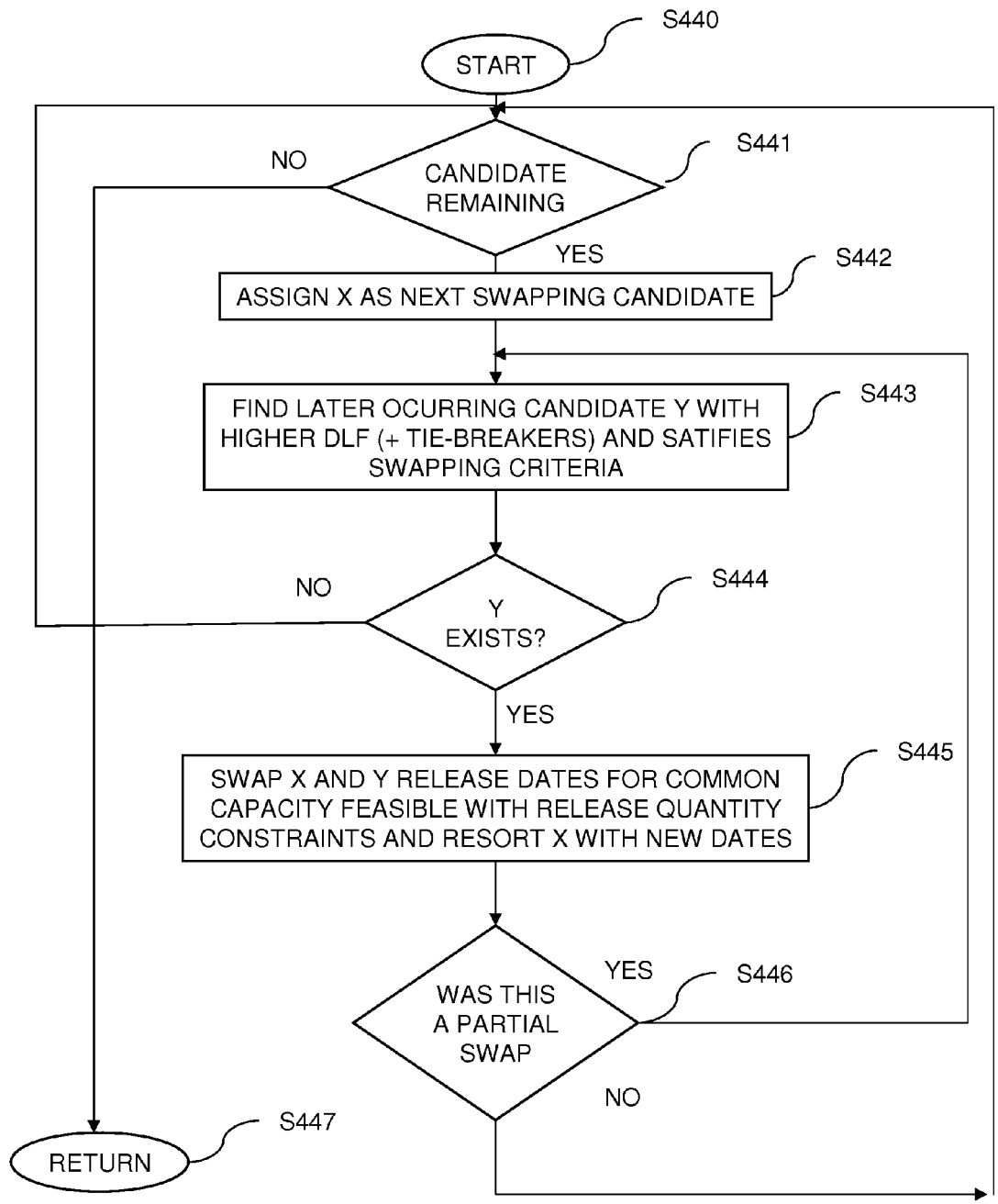
FIG. 5 shows an expanded flowchart of exemplary core swapping logic according to this invention.
Figure 6:
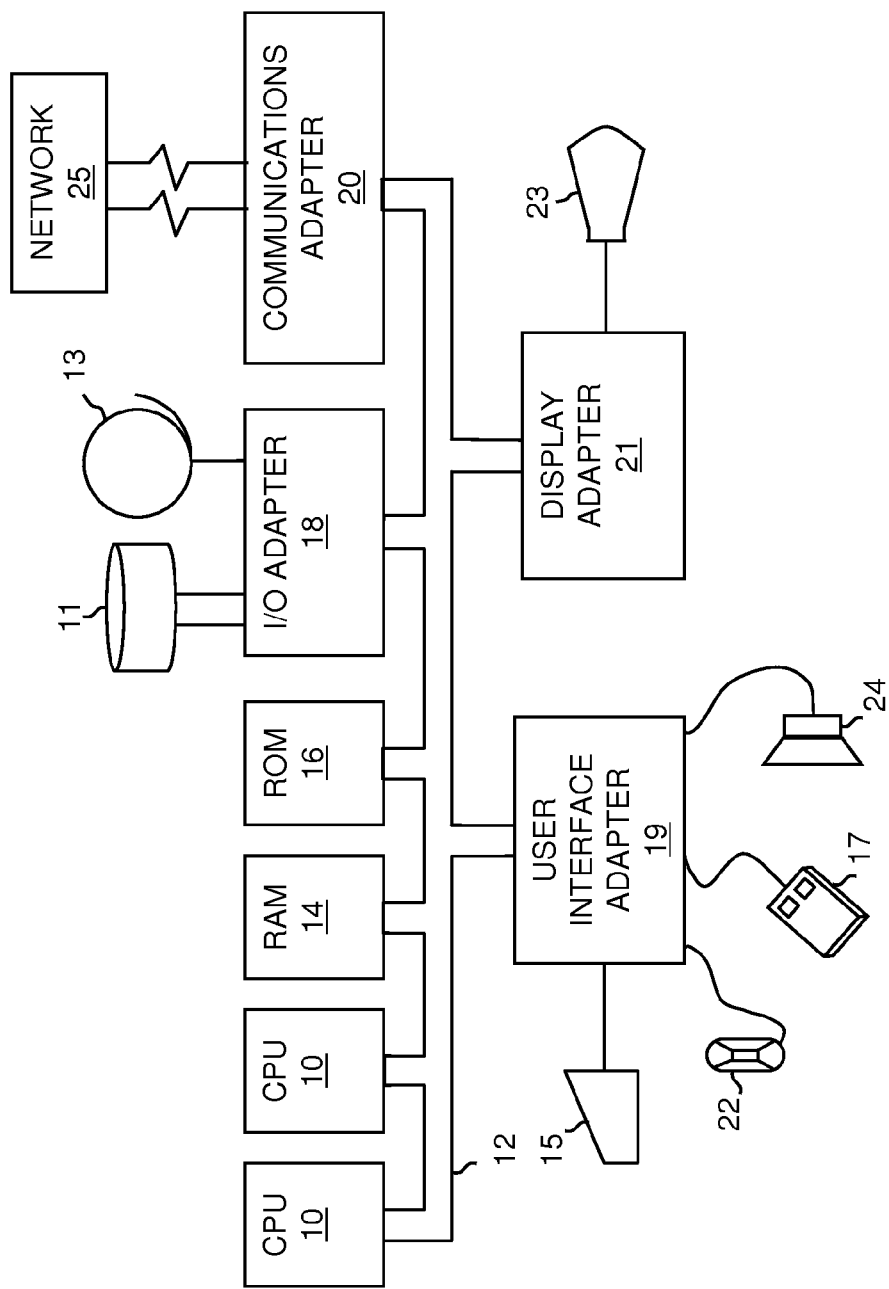
FIG. 6 shows an exemplary hardware environment for practicing the embodiments of the invention.

FIG. 5 shows an expanded flowchart of exemplary core swapping logic according to this invention. The process begins at step S440 and immediately continues to step S441. In step S441 a determination is made as to whether a candidate exists or whether additional candidates remain to be processed. If no candidate exists or remains to be processed, control continues to step S447 and the process returns and immediately continues to step S450 of FIG. 4 which in turn returns and continues to step S500 of FIG. 1.

Otherwise, if a candidate is identified, control continues to step S442 of FIG. 5 where the candidate is assigned as the next swapping candidate. That is, for each candidate manufacturing release, X is set equal to the next candidate manufacturing release (in the sorted list). X is a candidate to be swapped in time with a manufacturing release later in the list. The capacity consumption rates of X are then found. After the next swapping candidate has been assigned, control continues to step S443.

In step S443, a later occurring candidate Y is identified based on candidates that have higher value demand likelihood factors and which satisfy swapping criteria.

In one exemplary embodiment according to this invention, the candidate for swapping with X is determined by picking the candidate Y as follows:

Valid candidates for swapping with X must meet the below criteria:
  i. has a higher demand-likelihood-factor than X
  ii. has a planned manufacturing release date which is later than X
  iii. has a planned manufacturing release date which is no earlier than the latest date that X may be released without delaying its [safety time offset] consumption from inventory
  iv. consumes capacity such that if the candidate is swapped (or partially swapped) with X that each will have capacity available in the respective swapped time periods to support their release (or partial release) at that time. However, this method works best if parts consume identical or near identical bottleneck capacity resources. When the capacity implications of swapping are considered, the manufacturing plant will not be changed, but the process used to produce a part at its existing plant may be changed if necessary to support the swap.
  v. will not cause a failure to satisfy minimum-starts constraints if X and Y are swapped. Minimum-starts constraints encourage a minimum number of manufacturing releases of specified products or groups of products to be made. It may be necessary to split either X or the candidate to move earlier in order to not introduce a violation of the minimum-starts constraint. When lotsizing applies, any splitting of manufacturing releases must be done in a manner which does not result in either manufacturing release violating the lotsize. This lotsizing restriction applies to all splitting situations and not solely to this substep. Conventional methods of splitting manufacturing releases without violation of lotsizing constraints is discussed further in co-assigned U.S. Pat. No. 7,515,983, incorporated herein by reference in its entirety.
  vi. it is also necessary to confirm that a swap of X and the candidate will not result in the candidate manufacturing release becoming late due to data anomalies in stated cycle times which appear to decrease by a greater magnitude than the change in the release date Given that those above conditions are met select the release Y which supports the highest demand-likelihood-factor of the candidates and in case equally high demand-likelihood-factors among the candidates:
  a. as a tie breaker, allow X to be delayed as long as possible;
  b. as a secondary tie-breaker, allow as large a quantity of X to be delayed as possible.

Control then continues to step S444 where a determination is made as to whether the candidate Y exists. If it is determined that candidate Y does not exist, control continues to step S441.

If it is determined that candidate Y does exist, control continues to step S445 and a swap is executed. The swap is executed by switching the release dates of X and Y for as large a quantity of X as possible. The term "large . . . as possible," means that one of X or Y will have a smaller (capacity normalized) quantity than the other and that smaller quantity will limit the amount that can be swapped; moreover, the amount swapped needs to remain capacity feasible; furthermore, the release quantities of either or both may need to change to ensure that the total to-stock quantity of each remains constant even in the case where the underlying yield changes as a result of the swap. However, it should be noted that once X has been delayed, it remains a candidate for further delay and should be placed into its new proper place in the sorted list of candidates to be released. After the swap has been executed, control continues to step S446.

In step S446 a determination is made as to whether a partial swap was made. A partial swap occurs when the release quantity of X swapped with Y is only a subset of the release quantity of X. If it is determined that a partial swap was made, then control jumps immediately to step S443 to identify another best candidate to swap with the remains of X.

Otherwise if it is determined that the swap was not a partial swap, control continues to step S441 and a new X candidate is identified. If a new candidate is not identified, control continues to step S447 and returns via step S450 of FIG. 4 to step S500 of FIG. 1.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
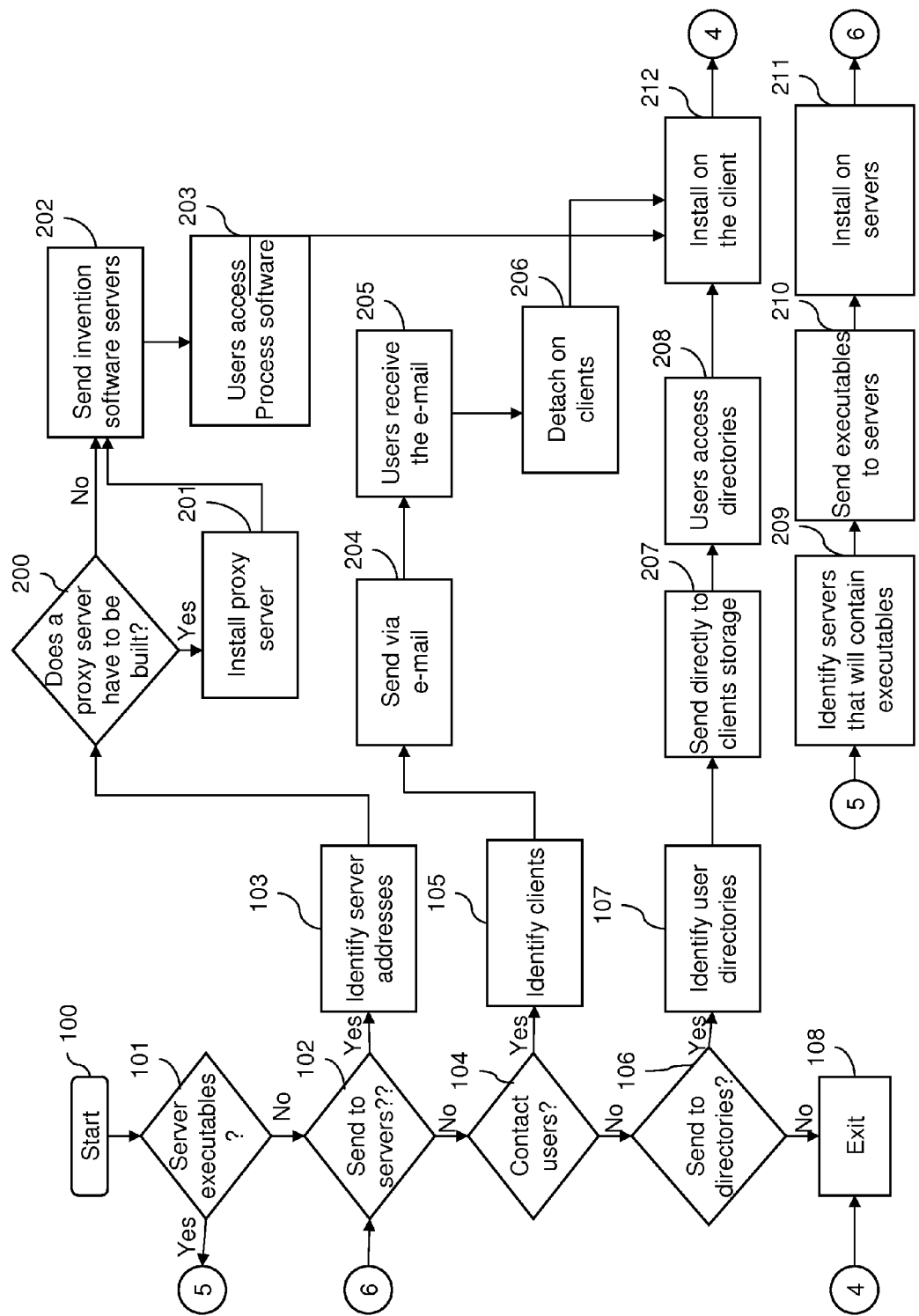
FIG. 7 is a flow diagram of methods for deployment.

A representative hardware environment for practicing the embodiments of the invention is depicted in FIG. 7. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer-readable instructions for rescheduling manufacturing releases include various deployment types such as loading directly in the client, server and proxy computers via loading a storage medium such as a CD, DVD, etc., The process software may also be automatically or semi-automatically deployed into a computer system by sending the process software to a central server or a group of central servers. The process software is then downloaded into the client computers that will execute the process software. The process software is sent directly to the client system via e-mail. The process software is then either detached to a directory or loaded into a directory by a button on the e-mail that executes a program that detaches the process software into a directory. Send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

While it is understood that the process software for rescheduling manufacturing releases may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

FIG. 7 refers to methods for deployment of the systems and methods for rescheduling manufacturing releases. Step 100 begins the deployment of the process software. The first thing is to determine if there are any programs that will reside on a server or servers when the process software is executed 101. If this is the case then the servers that will contain the executables are identified 209. The process software for the server or servers is transferred directly to the servers' storage via FTP or some other protocol or by copying though the use of a shared file system 210. The process software is then installed on the servers 211.

Next, a determination is made on whether the process software is be deployed by having users access the process software on a server or servers 102. If the users are to access the process software on servers then the server addresses that will store the process software are identified 103.

A determination is made if a proxy server is to be built 200 to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed 201. The process software is sent to the servers either via a protocol such as FTP or it is copied directly from the source files to the server files via file sharing 202. Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems 203. Another embodiment is to have the servers automatically copy the process software to each client and then run the installation program for the process software at each client computer. The user executes the program that installs the process software on his client computer 212 then exits the process 108.

In step 104 a determination is made whether the process software is to be deployed by sending the process software to users via e-mail. The set of users where the process software will be deployed are identified together with the addresses of the user client computers 105. The process software is sent via e-mail 204 to each of the users' client computers. The users then receive the e-mail 205 and then detach the process software from the e-mail to a directory on their client computers 206. The user executes the program that installs the process software on his client computer 212 then exits the process 108.

Lastly a determination is made on whether to the process software will be sent directly to user directories on their client computers 106. If so, the user directories are identified 107. The process software is transferred directly to the user's client computer directory 207. This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software 208. The user executes the program that installs the process software on his client computer 212 then exits the process 108.

The process software which consists of systems and methods for rescheduling manufacturing releases is integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 8:
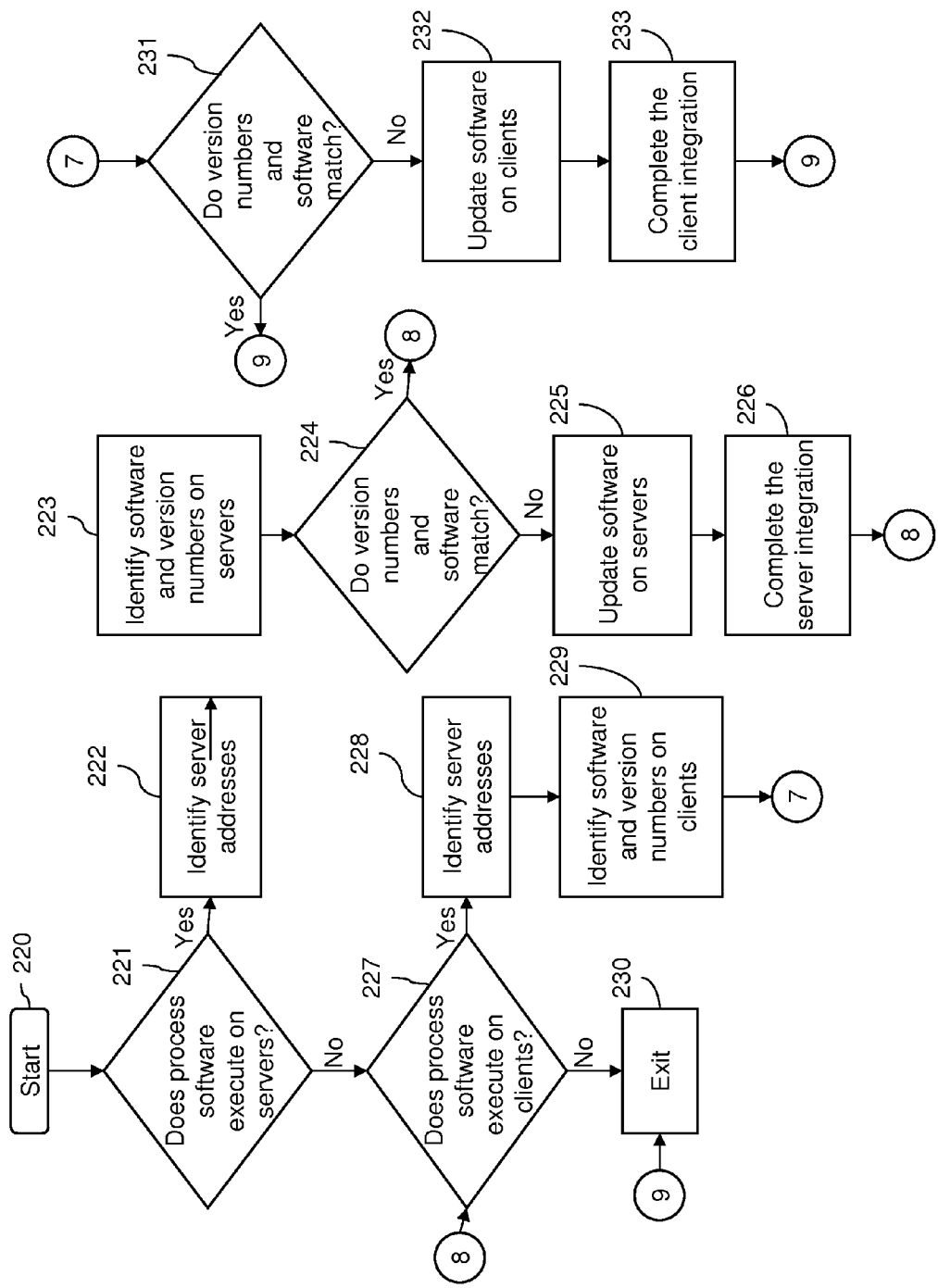
FIG. 8 is a flow diagram of methods for integration.

FIG. 8 refers to the methods for integration for systems and methods of rescheduling manufacturing releases. Step 220 begins the integration of the process software. The first thing is to determine if there are any process software programs that will execute on a server or servers 221. If this is not the case, then integration proceeds to 227. If this is the case, then the server addresses are identified 222. The servers are checked to see if they contain software that includes the operating system (OS), applications, and network operating systems (NOS), together with their version numbers, which have been tested with the process software 223. The servers are also checked to determine if there is any missing software that is required by the process software 223.

A determination is made if the version numbers match the version numbers of OS, applications and NOS that have been tested with the process software 224. If all of the versions match and there is no missing required software the integration continues in 227.

If one or more of the version numbers do not match, then the unmatched versions are updated on the server or servers with the correct versions 225. Additionally if there is missing required software, then it is updated on the server or servers 225. The server integration is completed by installing the process software 226.

Step 227 which follows either 221, 224 or 226 determines if there are any programs of the process software that will execute on the clients. If no process software programs execute on the clients the integration proceeds to 230 and exits. If this not the case, then the client addresses are identified 228.

The clients are checked to see if they contain software that includes the operating system (OS), applications, and network operating systems (NOS), together with their version numbers, which have been tested with the process software 229. The clients are also checked to determine if there is any missing software that is required by the process software 229.

A determination is made as to whether the version numbers match the version numbers of OS, applications and NOS that have been tested with the process software 231. If all of the versions match and there is no missing required software, then the integration proceeds to 230 and exits.

If one or more of the version numbers do not match, then the unmatched versions are updated on the clients with the correct versions 232. In addition, if there is missing required software then it is updated on the clients 232. The client integration is completed by installing the process software on the clients 233. The integration proceeds to 230 and exits.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc. When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload. The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider. In another embodiment, the service provider requests payment directly from a customer account at a banking or financial institution. In another embodiment, if the service provider is also a customer of the customer that uses the process software application, the payment owed to the service provider is reconciled to the payment owed by the service provider to minimize the transfer of payments.

The process software of methods for rescheduling manufacturing releases is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 9:
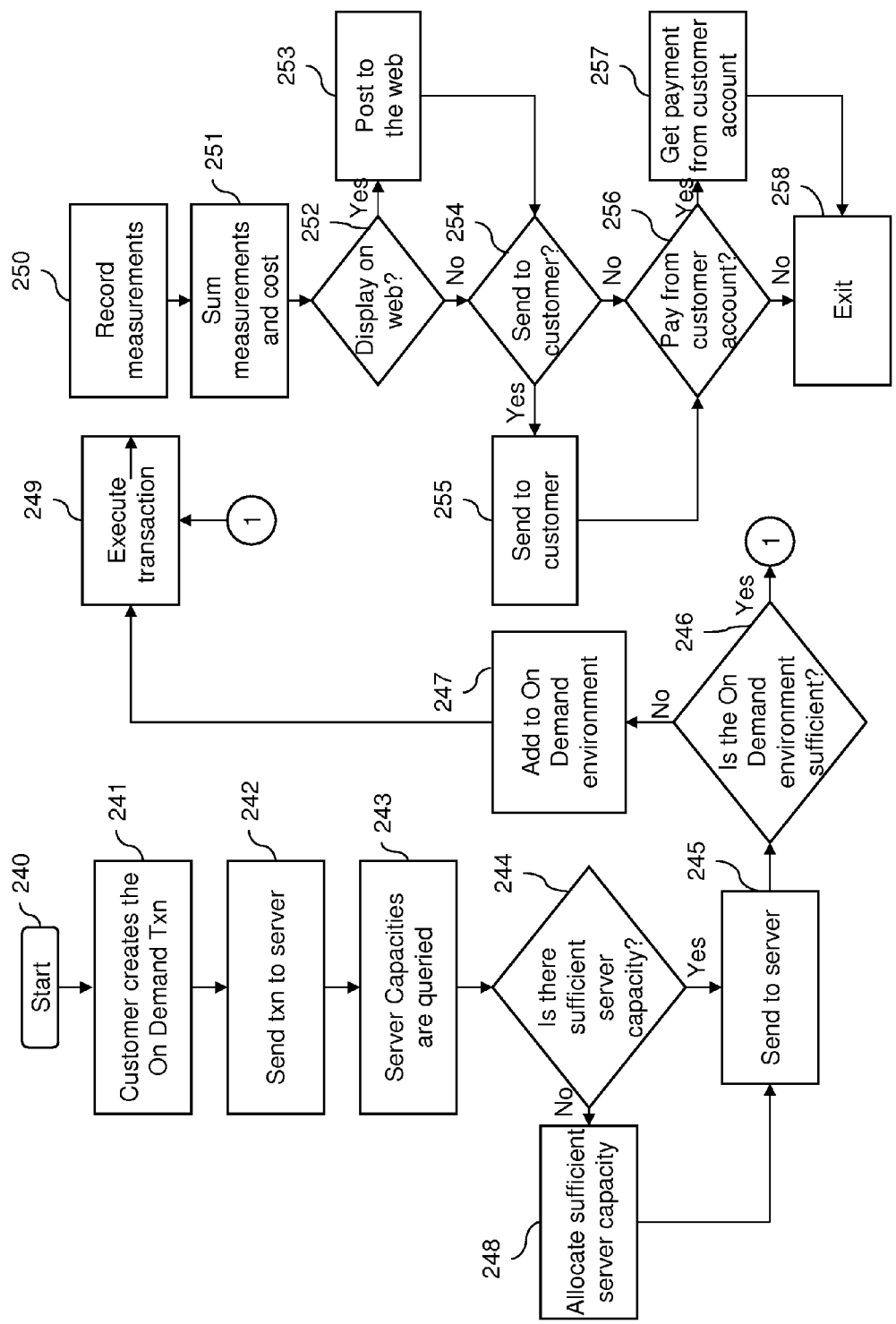
FIG. 9 is a flow diagram of methods for on-demand implementation.

FIG. 9 refers to methods for On Demand access to systems and methods of rescheduling manufacturing releases. Step 240 begins the On Demand process. A transaction is created than contains the unique customer identification, the requested service type and any service parameters that further specify the type of service 241. The transaction is then sent to the main server 242. In an On Demand environment the main server can initially be the only server, then as capacity is consumed other servers are added to the On Demand environment.

The server central processing unit (CPU) capacities in the On Demand environment are queried 243. The CPU requirement of the transaction is estimated, then the servers available CPU capacity in the On Demand environment are compared to the transaction CPU requirement to see if there is sufficient CPU available capacity in any server to process the transaction 244. If there is not sufficient server CPU available capacity, then additional server CPU capacity is allocated to process the transaction 248. If there was already sufficient Available CPU capacity then the transaction is sent to a selected server 245.

Before executing the transaction, a check is made of the remaining On Demand environment to determine if the environment has sufficient available capacity for processing the transaction. This environment capacity consists of such things as but not limited to network bandwidth, processor memory, storage etc. 246. If there is not sufficient available capacity, then capacity will be added to the On Demand environment 247. Next the required software to process the transaction is accessed, loaded into memory, then the transaction is executed 249.

The usage measurements are recorded 250. The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer 251. If the customer has requested that the On Demand costs be posted to a web site 252 then they are posted 253.

If the customer has requested that the On Demand costs be sent via e-mail to a customer address 254 then they are sent 255. If the customer has requested that the On Demand costs be paid directly from a customer account 256 then payment is received directly from the customer account 257. The last step is exit the On Demand process.

Figure 10:
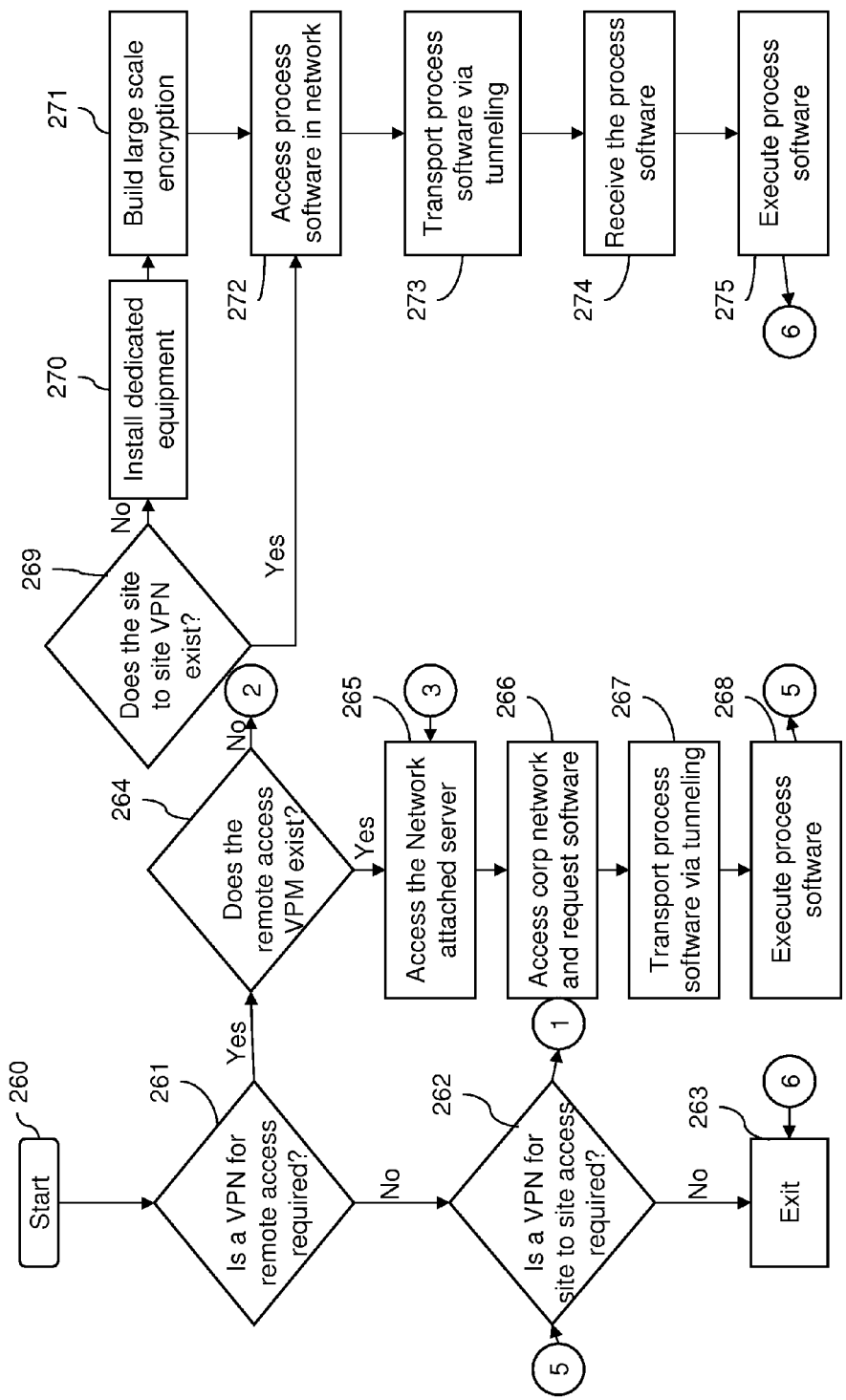
FIG. 10 is a first flow diagram of methods for VPN Service.
Figure 11:
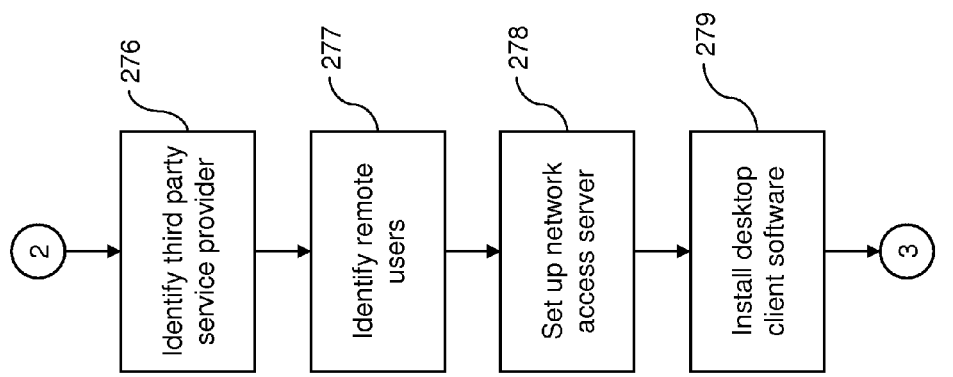
FIG. 11 is a second flow diagram providing additional detail of the first flow diagram of methods for VPN service.

It should be apparent that the process software for rescheduling manufacturing releases may be deployed, accessed and executed through the use of a virtual private network (VPN), which is any combination of technologies that can be used to secure a connection through an otherwise unsecured or untrusted network as shown in FIGS. 10-11. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

FIGS. 10-11 refers to systems and methods for rescheduling manufacturing releases using VPN service. Step 260 begins the Virtual Private Network (VPN) process. A determination is made to see if a VPN for remote access is required 261. If it is not required, then proceed to 262. If it is required, then determine if the remote access VPN exists 264.

If it does exist, then proceed to 265. Otherwise identify the third party provider that will provide the secure, encrypted connections between the company's private network and the company's remote users 276. The company's remote users are identified 277. The third party provider then sets up a network access server (NAS) 278 that allows the remote users to dial a toll free number or attach directly via a cable or DSL modem to access, download and install the desktop client software for the remote-access VPN 279.

After the remote access VPN has been built or if it been previously installed, the remote users can then access the process software by dialing into the NAS or attaching directly via a cable or DSL modem into the NAS 265. This allows entry into the corporate network where the process software is accessed 266. The process software is transported to the remote user's desktop over the network via tunneling. That is the process software is divided into packets and each packet including the data and protocol is placed within another packet 267. When the process software arrives at the remote user's desktop, it is removed from the packets, reconstituted and then is executed on the remote users desktop 268.

A determination is made to see if a VPN for site to site access is required 262. If it is not required, then proceed to exit the process 263. Otherwise, determine if the site to site VPN exists 269. If it does exist, then proceed to 272. Otherwise, install the dedicated equipment required to establish a site to site VPN 270. Then build the large scale encryption into the VPN 271.

After the site to site VPN has been built or if it had been previously established, the users access the process software via the VPN 272. The process software is transported to the site users over the network via tunneling. That is the process software is divided into packets and each packet including the data and protocol is placed within another packet 274. When the process software arrives at the remote user's desktop, it is removed from the packets, reconstituted and is executed on the site users desktop 275. Proceed to exit the process 263.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
   using a computer, identifying a plurality of manufacturing release information elements based on a first run of a first advanced planning system, said manufacturing release information elements comprising dates of planned manufacturing release and quantity;
   using said computer, sorting said plurality of manufacturing release information elements based on demand-likelihood factors associated with assets used in manufacturing and a plurality of sorting criteria;
   using said computer, swapping said plurality of manufacturing release information elements based on said demand-likelihood factors and at least one swapping constraint, said swapping comprising:
      identifying swap candidates from bottom bills of materials which do not support daily-going-rates;
      determining earliness of candidate releases;
      sorting releases based on earliest releases, least demand likelihood factors, and largest number of days early;
      assigning a next swapping candidate;
      finding a later swapping candidate associated with a higher value of said demand likelihood factors and that satisfies said swapping criteria; and
      swapping said next swapping candidate and said later swapping candidate;
   using said computer, fixing said plurality of manufacturing release information elements; and
   using said computer, outputting said plurality of manufacturing release information elements that have been fixed as results.

2. The method of claim 1, further comprising: using said computer, performing a second advanced planning system run on said plurality of manufacturing release information elements that have been fixed before said outputting.

3. The method of claim 1, said first run of said first advanced planning system executing without stability.

4. The method of claim 1, said advanced planning system being based on at least one of: linear programming and heuristic method.

5. The method of claim 1, said plurality of manufacturing release information elements being associated with demands traced through a bills of materials supply chain to underlying assets.

6. The method of claim 5, a weighted average being used when said underlying assets support multiple demands.

7. The method of claim 6, said underlying assets being split when non-lotsized underlying assets support multiple demand likelihood factors non-concurrently.

8. The method of claim 1, further comprising: in the event that said swapping of said next swapping candidate and said later swapping candidate is a partial swap, continue finding later swapping candidates associated with a higher value of said demand likelihood factors that satisfies said swapping criteria for candidates remaining after said partial swap.

9. A computer-implemented method comprising:
   using a computer, identifying a plurality of manufacturing release information elements based on a first run of a first advanced planning system, said manufacturing release information elements comprising dates of planned manufacturing release and quantity;
   using said computer, sorting said plurality of manufacturing release information elements based on demand-likelihood factors associated with assets used in manufacturing and a plurality of sorting criteria;
   using said computer, swapping said plurality of manufacturing release information elements based on said demand-likelihood factors and at least one swapping constraint, said swapping comprising:

finding capacity consumption rates of each X, where X is a candidate manufacturing release in a list of manufacturing release information elements that have been sorted;

identifying a best candidate for swapping with X based on selection of a swap candidate which supports a highest demand-likelihood-factor of candidates meeting the following criteria:

as a tie breaker, allowing X to be delayed;

as a secondary tie-breaker, allowing a quantity of X to be delayed and which meets all of the following criteria:

said swap candidate has a higher demand-likelihood-factor than X, said swap candidate has a planned manufacturing release date which is later than X, said swap candidate has a planned manufacturing release date which is no earlier than the latest date that X may be released without delaying its consumption from inventory, said swap candidate consumes capacity such that if said swap candidate is swapped with X said swap candidate and X will have capacity available in their respective swapped time periods to support their release at that time, and said swap candidate will not cause a failure to satisfy any minimum-starts constraints if X and said swap candidate are swapped, and swapping release date of said swap candidate and X, for a quantity of X;

using said computer, fixing said plurality of manufacturing release information elements; and using said computer, outputting said plurality of manufacturing release information elements that have been fixed as results.

10. An apparatus for rescheduling manufacturing releases comprising:

a memory storing output of advanced planning systems;

a processor that identifies a plurality of release information elements from a first run of a first advanced planning system stored in said memory, said release information elements comprising dates of planned manufacturing release and quantity, said processor; sorting said plurality of release information elements based on demand-likelihood factors associated with assets used in manufacturing and a plurality of sorting criteria; swapping said plurality of release information elements based on said demand-likelihood factors and at least one swapping constraint; and fixing said plurality of release information elements; and an output circuit, connected to said processor and said memory for outputting said plurality of release information elements that have been fixed as results, said processor swapping candidates being based on:

identifying swap candidates from bottom bills of materials which do not support daily-going-rates;

determining earliness of candidate releases;

sorting releases based on earliest releases, least demand likelihood factors, and largest number of days early;

assigning a next swapping candidate;

finding a later swapping candidate associated with a higher value of said demand-likelihood factors and that satisfies swapping criteria; and swapping said next swapping candidate and said later swapping candidate.

11. The apparatus of claim 10, said processor storing said plurality of release information elements that have been fixed in said memory and said first advanced planning system further transforming said plurality of release information elements that have been fixed in a second run which is received and stored by said processor as said results in said memory before said outputting.

12. The apparatus of claim 10, said first advanced planning system being based on at least one of: linear programming and heuristic method.

13. The apparatus of claim 10, said processor associating said plurality of release information elements with demands traced through a bills of materials supply chain to underlying assets.

14. The apparatus of claim 13, said processor using a weighted average when said underlying assets support multiple demands.

15. The apparatus of claim 14, said processor splitting said underlying assets when non-lotsized underlying assets support multiple demand likelihood factors non-concurrently.

16. The apparatus of claim 10, said processor determining if said swapping of said next swapping candidate and said later swapping candidate is a partial swap; and in the event that said swapping of said next swapping candidate and said later swapping candidate is a partial swap, said processor finding later swapping candidates associated with a higher value of said demand likelihood factors that satisfies said swapping criteria for candidates remaining after said partial swap.

17. An apparatus for rescheduling manufacturing releases comprising:

a memory storing output of advanced planning systems;

a processor that identifies a plurality of release information elements from a first run of a first advanced planning system stored in said memory, said release information elements comprising dates of planned manufacturing release and quantity, said processor: sorting said plurality of release information elements based on demand-likelihood factors associated with assets used in manufacturing and a plurality of sorting criteria; swapping said plurality of release information elements based on said demand-likelihood factors and at least one swapping constraint; and fixing said plurality of release information elements; and an output circuit, connected to said processor and said memory for outputting said plurality of release information elements that have been fixed as results, said processor swapping of said plurality of release elements comprising:

finding capacity consumption rates of each X, where X is a candidate manufacturing release in a list of release information elements that have been sorted;

identifying a best candidate for swapping with X based on selection of a swap candidate which supports a highest demand-likelihood-factor of candidates meeting the following criteria:

as a tie breaker, allowing X to be delayed;

as a secondary tie-breaker, allowing a quantity of X to be delayed and which meets all of the following criteria:

said swap candidate has a higher demand-likelihood-factor than X, said swap candidate has a planned manufacturing release date which is later than X, said swap candidate has a planned manufacturing release date which is no earlier than the latest date that X may be released without delaying its consumption from inventory, said swap candidate consumes capacity such that if said swap candidate is swapped with X said swap candidate and X will have capacity available in their respective swapped time periods to support their release at that time, and said swap candidate will not cause a failure to satisfy any minimum-starts constraints if X and said swap candidate are swapped, and swapping release date of said swap candidate and X, for a quantity of X.

* * * * *